US012255324B2

United States Patent
Kim et al.

(10) Patent No.: US 12,255,324 B2
(45) Date of Patent: Mar. 18, 2025

(54) NEGATIVE ELECTRODE AND SECONDARY BATTERY INCLUDING THE SAME

(71) Applicant: LG Energy Solution, Ltd., Seoul (KR)

(72) Inventors: Tae Gon Kim, Daejeon (KR); Ki Won Sung, Daejeon (KR); Joo Yul Baek, Daejeon (KR); Min Kwak, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 354 days.

(21) Appl. No.: 17/775,710

(22) PCT Filed: Apr. 21, 2021

(86) PCT No.: PCT/KR2021/005040
§ 371 (c)(1),
(2) Date: May 10, 2022

(87) PCT Pub. No.: WO2021/215830
PCT Pub. Date: Oct. 28, 2021

(65) Prior Publication Data
US 2022/0384790 A1 Dec. 1, 2022

(30) Foreign Application Priority Data
Apr. 22, 2020 (KR) .................. 10-2020-0048940

(51) Int. Cl.
*H01M 4/62* (2006.01)
*H01M 4/04* (2006.01)
(Continued)

(52) U.S. Cl.
CPC ......... *H01M 4/483* (2013.01); *H01M 4/0404* (2013.01); *H01M 4/134* (2013.01);
(Continued)

(58) Field of Classification Search
CPC .... H01M 4/483; H01M 4/0404; H01M 4/134; H01M 4/625; H01M 10/0525; H01M 2004/027
See application file for complete search history.

(56) References Cited

U.S. PATENT DOCUMENTS 6,183,714 B1 * 2/2001 Smalley ................ B82Y 30/00
423/445 B
2013/0065125 A1 3/2013 Sawaki et al.
(Continued)

FOREIGN PATENT DOCUMENTS

CN 103109404 A 5/2013
CN 107634184 A * 1/2018
(Continued)

OTHER PUBLICATIONS

International Search Report for PCT/KR2021/005040 dated Jul. 26, 2021. 3 pgs.

*Primary Examiner* — Maria Laios
*Assistant Examiner* — Ziheng Lu
(74) *Attorney, Agent, or Firm* — Lerner David LLP (57) ABSTRACT

The present invention relates to a negative electrode including a negative electrode collector, a first negative electrode active material layer disposed on the negative electrode collector, and a second negative electrode active material layer disposed on the first negative electrode active material layer, wherein the second negative electrode active material layer includes a second negative electrode active material and a second conductive agent, wherein the second negative electrode active material includes a silicon-based active material, the silicon-based active material includes $SiO_x$ ($0 \leq x < 2$), the second conductive agent includes a carbon nanotube structure in which 2 to 5,000 single-walled carbon nanotube units are bonded side by side, and the carbon nanotube structure is included in an amount of 0.01 wt % to
(Continued)

1.0 wt % in the second negative electrode active material layer, and a secondary battery including the same.

10 Claims, 5 Drawing Sheets

(51) Int. Cl.
  *H01M 4/134*  (2010.01)
  *H01M 4/38*  (2006.01)
  *H01M 4/48*  (2010.01)
  *H01M 10/0525*  (2010.01)
  *H01M 4/02*  (2006.01)

(52) U.S. Cl.
  CPC ........... *H01M 4/386* (2013.01); *H01M 4/625* (2013.01); *H01M 10/0525* (2013.01); *H01M 2004/027* (2013.01)

(56) References Cited

U.S. PATENT DOCUMENTS

| | | |
|---|---|---|
| 2013/0344382 A1 | 12/2013 | Li et al. |
| 2015/0280221 A1 | 10/2015 | Abdelsalam et al. |
| 2018/0219212 A1* | 8/2018 | Seol ................. H01M 4/364 |
| 2019/0036186 A1* | 1/2019 | Kim .................. H01M 4/8867 |
| 2019/0044150 A1 | 2/2019 | Kim et al. |
| 2020/0006772 A1* | 1/2020 | Yu ..................... H01M 4/139 |
| 2020/0243848 A1 | 7/2020 | Kim et al. |
| 2021/0020907 A1 | 1/2021 | Kim et al. |
| 2021/0194002 A1 | 6/2021 | Matsuo et al. |

FOREIGN PATENT DOCUMENTS

| | | | |
|---|---|---|---|
| CN | 108963187 A | | 12/2018 |
| CN | 110010860 A | | 7/2019 |
| JP | 2013077391 A | | 4/2013 |
| JP | 2014003015 A | | 1/2014 |
| JP | 2015011959 A | | 1/2015 |
| JP | 2015018663 A | | 1/2015 |
| JP | 2017084759 A | | 5/2017 |
| JP | 2018125077 A | | 8/2018 |
| KR | 20130134241 A | | 12/2013 |
| KR | 20150086288 A | | 7/2015 |
| KR | 20170107213 A | * | 9/2017 |
| KR | 20170113250 A | | 10/2017 |
| KR | 20190065172 A | | 6/2019 |
| KR | 20190117387 A | | 10/2019 |
| WO | 2019194662 A1 | | 10/2019 |
| WO | 2020021763 A1 | | 1/2020 |

* cited by examiner

NEGATIVE ELECTRODE AND SECONDARY BATTERY INCLUDING THE SAME

CROSS-REFERENCE TO RELATED APPLICATIONS

This application is a national phase entry under 35 U.S.C. § 371 of International Application No. PCT/KR2021/005040, filed on Apr. 21, 2021, which claims priority from Korean Patent Application No. 10-2020-0048940, filed on April 22, 2020, the disclosures of which are incorporated by reference herein.

TECHNICAL FIELD

The present invention relates to a negative electrode including a negative electrode collector, a first negative electrode active material layer disposed on the negative electrode collector, and a second negative electrode active material layer disposed on the first negative electrode active material layer, wherein the second negative electrode active material layer includes a second negative electrode active material and a second conductive agent, wherein the second negative electrode active material includes a silicon-based active material, the silicon-based active material includes $SiO_x$ (0≤x<2), the second conductive agent includes a carbon nanotube structure in which 2 to 5,000 single-walled carbon nanotube units are bonded side by side, and the carbon nanotube structure is included in an amount of 0.01 wt % to 1.0 wt % in the second negative electrode active material layer, and a secondary battery including the same.

BACKGROUND ART

Demand for batteries as an energy source has been significantly increased as technology development and demand with respect to mobile devices have recently increased, and a variety of researches on batteries capable of meeting various needs have been carried out accordingly. Particularly, as a power source for such devices, research into lithium secondary batteries having excellent lifetime and cycle characteristics as well as high energy density has been actively conducted.

A lithium secondary battery denotes a battery in which a non-aqueous electrolyte containing lithium ions is included in an electrode assembly which includes a positive electrode including a positive electrode active material capable of intercalating/deintercalating the lithium ions, a negative electrode including a negative electrode active material capable of intercalating/deintercalating the lithium ions, and a microporous separator disposed between the positive electrode and the negative electrode.

Since conductivity of the negative electrode may not be secured only by the negative electrode active material, resistance of the battery may be excessively high, and thus, the negative electrode typically additionally includes a conductive agent. Typically, a point-type conductive agent, such as carbon black, has mainly been used, and a line-type conductive agent, such as carbon nanotubes and carbon nanofibers, has also been used to improve capacity of the battery by further improving the conductivity.

A single-walled carbon nanotube is one of the line-type conductive agents, and conductivity in a negative electrode active material layer is improved due to its thin and elongated shape. Thus, typically, after a negative electrode slurry was prepared by using a dispersion in which the single-walled carbon nanotubes were completely dispersed, the negative electrode active material layer was prepared by using the negative electrode slurry.

However, when charge and discharge of the battery are repeated, the single-walled carbon nanotubes are broken as volume expansion and contraction of the negative electrode active material are repeated, and thus, it may be difficult to maintain a conductive network in the negative electrode active material layer. Particularly, in a case in which a silicon-based active material is used as a negative electrode active material to improve the capacity of the battery, since a volume of the silicon-based active material excessively expands due to charge and discharge of the battery, a phenomenon of breakage of the single-walled carbon nanotubes occurs more severely. Accordingly, the conductive network is blocked or reduced, and this degrades life characteristics of the battery. Also, since the single-walled carbon nanotube surrounds a surface of the silicon-based active material, it may not smoothly play a role in electrically connecting adjacent negative electrode active materials to each other.

In a case in which carbon nanotubes are used as a conductive agent, a carbon nanotube dispersion having a low solid content must be used in order to uniformly arrange the carbon nanotubes in the negative electrode active material layer. However, if the carbon nanotube dispersion having a low solid content is used, there is a problem in that negative electrode adhesion and electrical conductivity are significantly reduced due to the occurrence of a migration phenomenon in which a binder and the conductive agent, which have relatively lower density than the negative electrode active material, easily move to an upper portion of the negative electrode active material layer (direction away from a current collector) during drying of the negative electrode.

Thus, the present invention introduces a negative electrode in which the conductive network may be connected even with a large volume change of the negative electrode active material and the problem caused by the migration phenomenon of the binder may be minimized.

DISCLOSURE OF THE INVENTION

Technical Problem

An aspect of the present invention provides a negative electrode which may improve input/output characteristics and life characteristics by minimizing a problem caused by a migration phenomenon of a binder while maintaining a conductive network smoothly.

Another aspect of the present invention provides a secondary battery including the negative electrode.

Technical Solution

According to an aspect of the present invention, there is provided a negative electrode including a negative electrode collector, a first negative electrode active material layer disposed on the negative electrode collector, and a second negative electrode active material layer disposed on the first negative electrode active material layer, wherein the second negative electrode active material layer includes a second negative electrode active material and a second conductive agent, wherein the second negative electrode active material includes a silicon-based active material, the silicon-based active material includes $SiO_x$ (0≤x<2), the second conductive agent includes a carbon nanotube structure in which 2 to 5,000 single-walled carbon nanotube units are bonded side by side, and the carbon nanotube structure is included in an amount of 0.01 wt % to 1.0 wt % in the second negative electrode active material layer.

According to another aspect of the present invention, there is provided a secondary battery including the negative electrode.

Advantageous Effects

Since a second negative electrode active material layer of a negative electrode according to the present invention includes a carbon nanotube structure in the form of a long rope, in which 2 to 5,000 single-walled carbon nanotube units are bonded side by side, during rolling, the carbon nanotube structure may strongly hold second negative electrode active material particles together while connecting the second negative electrode active material particles even with a large volume change of $SiO_x$ (0≤x<2) of the second negative electrode active material layer and the $SiO_x$ (0≤x<2) may suppress damage (e.g., crack). Also, since the negative electrode has a first negative electrode active material layer and the second negative electrode active material layer which are sequentially disposed as each of slurries, the above-described migration phenomenon of binder and conductive agent may be minimized. Furthermore, since the second negative electrode active material layer includes the carbon nanotube structure, adhesion between the first negative electrode active material layer and the second negative electrode active material layer may be strengthened. Accordingly, input/output characteristics and life characteristics of a battery may be improved.

MODE FOR CARRYING OUT THE INVENTION

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular example embodiments only and is not intended to be limiting of the present invention. In the specification, the terms of a singular form may include plural forms unless referred to the contrary.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

In the present specification, the expression "%" denotes wt % unless explicitly stated otherwise.

In the present specification, the expression "specific surface area" is measured by a Brunauer-Emmett-Teller (BET) method, wherein, specifically, the specific surface area may be calculated from a nitrogen gas adsorption amount at a liquid nitrogen temperature (77K) using BELSORP-mini II by Bel Japan Inc.

The expression "average particle diameter ($D_{50}$)" in the present specification may be defined as a particle diameter at a cumulative volume of 50% in a particle size distribution curve. The average particle diameter ($D_{50}$), for example, may be measured by using a laser diffraction method. The laser diffraction method may generally measure a particle diameter ranging from a submicron level to a few mm and may obtain highly repeatable and high-resolution results.

In the present invention, the expression "single-walled carbon nanotube unit" denotes a unit in the form of a single-walled tube composed of carbon atoms, and the expression "multi-walled carbon nanotube unit" denotes a unit in the form of a tube with multiple walls composed of carbon atoms.

Hereinafter, the present invention will be described in detail.

Negative Electrode

A negative electrode according to the present invention includes a negative electrode collector, a first negative electrode active material layer disposed on the negative electrode collector, and a second negative electrode active material layer disposed on the first negative electrode active material layer, wherein the second negative electrode active material layer includes a second negative electrode active material and a second conductive agent, wherein the second negative electrode active material includes a silicon-based active material, the silicon-based active material includes $SiO_x$ (0≤x<2), the second conductive agent includes a carbon nanotube structure in which 2 to 5,000 single-walled carbon nanotube units are bonded side by side, and the carbon nanotube structure may be included in an amount of 0.01 wt % to 1.0 wt % in the second negative electrode active material layer.

The negative electrode collector is not particularly limited so long as it has conductivity without causing adverse chemical changes in the battery. For example, copper, stainless steel, aluminum, nickel, titanium, fired carbon, aluminum or stainless steel that is surface-treated with one of carbon, nickel, titanium, silver, or the like may be used as the negative electrode collector. Specifically, a transition metal that absorbs carbon well, such as copper and nickel, may be used as the negative electrode collector.

The negative electrode may include a negative electrode active material layer. The negative electrode active material layer may be disposed on one surface or both surfaces of the negative electrode collector.

The negative electrode active material layer may include a first negative electrode active material layer and a second negative electrode active material layer. The first negative electrode active material layer may be disposed on the negative electrode collector, and may specifically be in contact with the negative electrode collector. The second negative electrode active material layer may be disposed on the first negative electrode active material layer, and the first negative electrode active material layer may be disposed between the second negative electrode active material layer and the negative electrode collector.

In general, in a case in which carbon nanotubes are used as a conductive agent, a carbon nanotube dispersion having a low solid content may be used in order to uniformly arrange the carbon nanotubes in the negative electrode active material layer. However, when the carbon nanotube dispersion having a low solid content is used, there is a problem in that negative electrode adhesion and electrical conductivity are significantly reduced due to the occurrence of a phenomenon (migration phenomenon, migration) in which a binder and the conductive agent, which have relatively lower density than the negative electrode active material, easily migrate to an upper portion of the negative electrode active material layer (far from the current collector and close to a surface) during drying of a negative electrode slurry. In contrast, since the negative electrode of the present invention has a first negative electrode active material layer and a second negative electrode active material layer which are sequentially disposed as each of slurries, the above-described migration phenomenon of the binder and the conductive agent may be minimized. Accordingly, input/output characteristics and life characteristics of a battery may be improved.

(1) First Negative Electrode Active Material Layer

The first negative electrode active material layer may include a first negative electrode active material.

The first negative electrode active material may be a negative electrode active material generally used in the art, and a type thereof is not particularly limited.

Specifically, the first negative electrode active material may include at least one of a carbon-based active material and a silicon-based active material, at least one selected from the group consisting of artificial graphite, natural graphite, graphitized carbon fibers, and graphitized mesocarbon microbeads may be used as the carbon-based active material, and rate capability may be improved particularly when the artificial graphite is used. At least one selected from the group consisting of $SiO_x$ ($0 \leq x < 2$), a Si—C composite, and a Si—Y alloy (where Y is an element selected from the group consisting of alkali metal, alkaline earth metal, transition metal, a Group 13 element, a Group 14 element, a rare earth element, and a combination thereof) may be used as the silicon-based active material, and high capacity of the battery may be obtained particularly when $SiO_x$ ($0 \leq x < 2$) is used. More specifically, the first negative electrode active material may be the carbon-based active material.

The first negative electrode active material may be included in an amount of 70 wt % to 99.5 wt %, for example, 80 wt % to 99 wt % in the first negative electrode active material layer. When the amount of the first negative electrode active material satisfies the above range, energy density of the negative electrode may be improved, negative electrode adhesion may be increased, and electrical conductivity in the negative electrode may be improved.

The first negative electrode active material layer may further include a first conductive agent.

The first conductive agent may include at least one selected from the group consisting of a carbon nanotube structure, a multi-walled carbon nanotube unit, graphene, and carbon black. The carbon nanotube structure will be described in detail later.

The first conductive agent may be included in an amount of 0.01 wt % to 2.0 wt %, particularly 0.01 wt % to 1.5 wt %, and more particularly 0.05 wt % to 1.0 wt % in the first negative electrode active material layer. In a case in which the amount of the first conductive agent satisfies the above range, the adhesion of the negative electrode and the electrical conductivity may be significantly improved even by using a small amount of the first conductive agent, and a battery having excellent input/output characteristics and life characteristics may be achieved.

The first negative electrode active material layer may have a thickness of 1 μm to 100 μm, particularly 5 μm to 90 μm, and more particularly 10 μm to 80 μm. In a case in which the thickness of the first negative electrode active material layer satisfies the above range, the above-described migration phenomenon of the binder and the conductive agent may be minimized. Accordingly, the adhesion of the negative electrode and the electrical conductivity may be significantly improved, and the input/output characteristics and the life characteristics of the battery may be improved.

(2) Second Negative Electrode Active Material Layer

The second negative electrode active material layer may include a second negative electrode active material and a second conductive agent.

The second negative electrode active material may include a silicon-based active material.

The silicon-based active material may include $SiO_x$ ($0 \leq x < 2$). The $SiO_x$ ($0 \leq x < 2$) may specifically be SiO. Since the second negative electrode active material includes the $SiO_x$ ($0 \leq x < 2$), capacity of the battery may be improved. Particularly, since the second negative electrode active material layer, instead of the first negative electrode active material layer, includes the $SiO_x$ ($0 \leq x < 2$), durability of the negative electrode may be improved and electrolyte solution impregnability may be improved. More specifically, at an interface between the negative electrode collector and the negative electrode active material layer, which has the weakest binding force in the negative electrode, there is a problem in that the negative electrode active material is easily exfoliated from the negative electrode due to contraction and expansion of the negative electrode active material during charge and discharge of the battery, and the above exfoliation phenomenon is accelerated when $SiO_x$ ($0 \leq X < 2$) is positioned near the negative electrode collector. Accordingly, the durability of the negative electrode is reduced, and the capacity and life characteristics of the battery are degraded.

Density near the surface of the negative electrode becomes excessively high during rolling in a negative electrode preparation process, and, accordingly, the electrolyte solution impregnability is reduced, wherein, if the $SiO_x$ ($0 \leq X < 2$) is positioned near the surface of the negative electrode, the density of the negative electrode is reduced to an appropriate level due to volume expansion of the $SiO_x$ ($0 \leq X < 2$) during initial charge of the battery and the electrolyte solution impregnability may be improved.

The silicon-based active material may further include a carbon coating layer formed on the $SiO_x$ ($0 \leq x < 2$). The carbon coating layer may be disposed on the $SiO_x$ ($0 \leq x < 2$). The carbon coating layer improves conductivity of the $SiO_x$ ($0 \leq x < 2$), and plays a role in suppressing an excessive volume expansion of the $SiO_x$ ($0 \leq x < 2$).

The carbon coating layer may include at least one of amorphous carbon and crystalline carbon.

The crystalline carbon may further improve the conductivity of the negative electrode active material. The crystalline carbon may include at least one selected from the group consisting of fullerenes, carbon nanotubes, and graphene.

The amorphous carbon may suppress expansion of natural graphite by appropriately maintaining strength of the coating layer. The amorphous carbon may be a carbide of at least one selected from the group consisting of tar, pitch, and other organic materials, or may be a carbon-based material formed by using a hydrocarbon as a source of chemical vapor deposition.

The carbide of the other organic materials may be a carbide of sucrose, glucose, galactose, fructose, lactose, mannose, ribose, aldohexose, or ketohexose, and a carbide of an organic material selected from a combination thereof.

The hydrocarbon may be a substituted or unsubstituted aliphatic or alicyclic hydrocarbon, or a substituted or unsubstituted aromatic hydrocarbon. The substituted or unsubstituted aliphatic or alicyclic hydrocarbon may include methrin, ethrin, ethylene, acetylene, propane, butane, butene, pentane, isobutane, or hexane. The substituted or unsubstituted aromatic hydrocarbon may include benzene, toluene, xylene, styrene, ethylbenzene, diphenylmethane, naphthalene, phenol, cresol, nitrobenzene, chlorobenzene, indene, coumarone, pyridine, anthracene, or phenanthrene.

The silicon-based active material may have an average particle diameter ($D_{50}$) of 0.1 μm to 20 μm, for example, 1 μm to 10 μm. In a case in which the average particle diameter satisfies the above range, a side reaction between the $SiO_x$ (0≤x<2) and the electrolyte solution may be suppressed, a decrease in initial efficiency may be prevented by controlling a lithium silicate formation reaction from the $SiO_x$ (0≤x<2), and initial capacity of the battery may be maximized.

The second negative electrode active material may further include a carbon-based active material. The carbon-based active material may include at least one selected from the group consisting of artificial graphite, natural graphite, and graphitized mesocarbon microbeads. Specifically, in terms of the fact that artificial graphite may effectively control volume expansion of the negative electrode while maintaining an electrical network with a carbon nanotube structure to be described later, the carbon-based active material may be the artificial graphite, but the carbon-based active material is not limited thereto.

A weight ratio of the silicon-based active material to the carbon-based active material may be in a range of 0.5:99.5 to 20:80, for example, 1:99 to 10:90. In a case in which the above range is satisfied, the capacity of the battery may be improved while the excessive volume expansion of the second negative electrode active material may be suppressed.

The second negative electrode active material may be included in an amount of 90 wt % to 99 wt %, for example, 95 wt % to 99 wt % in the second negative electrode active material layer. In a case in which the above range is satisfied, the energy density of the negative electrode may be highly maintained, and the conductivity and adhesion of the negative electrode may be improved.

The second conductive agent may further include a carbon nanotube structure.

The carbon nanotube structure may include a plurality of single-walled carbon nanotube units. Specifically, the carbon nanotube structure may be a carbon nanotube structure in which 2 to 5,000 single-walled carbon nanotube units are bonded side by side to each other. More specifically, in consideration of conductive network and durability of the second negative electrode active material layer, the carbon nanotube structure may be a carbon nanotube structure in which 2 to 4,500 single-walled carbon nanotube units, preferably 2 to 4,000 single-walled carbon nanotube units, and more preferably 2 to 200 single-walled carbon nanotube units are bonded to each other. In consideration of improvement in dispersibility of the carbon nanotube structure and the durability of the negative electrode, the carbon nanotube structure may be a carbon nanotube structure in which 2 to 50 single-walled carbon nanotube units are arranged side by side and bonded together.

In the carbon nanotube structure, the single-walled carbon nanotube units may be arranged side by side and bonded (cylindrical structure in the form of a bundle in which major axes of the units are bonded in parallel with each other to have flexibility) to form the carbon nanotube structure. The carbon nanotube structures may be interconnected to form a network structure in the second negative electrode active material layer.

Conventional electrodes including carbon nanotubes are generally prepared by dispersing bundle-type or entangled-type carbon nanotubes (form in which single-walled carbon nanotube units or multi-walled carbon nanotube units are attached to each other or intertwined) in a dispersion medium to prepare a conductive agent dispersion and then using the conductive agent dispersion. In this case, the carbon nanotubes are completely dispersed in the conventional conductive agent dispersion to exist as a conductive agent dispersion in which carbon nanotube units in the form of a single strand are dispersed. In this case, in the conventional conductive agent dispersion, the carbon nanotube units are easily cut by an excessive dispersion process so that the carbon nanotube units have a length shorter than an initial length. Also, the carbon nanotube units may also be easily cut in a rolling process of the negative electrode, and an additional limitation occurs in which the carbon nanotube units (particularly, single-walled carbon nanotube units) are cut by an excessive volume change of the silicon-based active material during operation of the battery. Accordingly, conductivity of the negative electrode may be reduced to degrade life characteristics of the battery. Furthermore, with respect to the multi-walled carbon nanotube unit, structural defects are high due to a mechanism of node growth (not a smooth linear shape, but nodes are present due to defects generated during a growth process). Thus, during the dispersion process, the multi-walled carbon nanotube units are more easily cut, and the short-cut multi-walled carbon nanotube units are likely to be aggregated with each other via π-π stacking of carbons of the unit. Accordingly, it is difficult for the multi-walled carbon nanotube units to be more uniformly dispersed and present in a negative electrode slurry.

Alternatively, with respect to the carbon nanotube structure included in the second negative electrode active material layer of the present invention, since the carbon nanotube structure is in the form of a rope in which 2 to 5,000 single-walled carbon nanotube units maintaining relatively high crystallinity without structural defects are arranged side by side and bonded together, the single-walled carbon nanotube units may not be cut even with changes in the volume of the second negative electrode active material and their length may be smoothly maintained, and thus, the conductivity of the negative electrode may be maintained even during continuous charge/discharge processes of the battery. Also, since the conductivity of the negative electrode is increased due to high conductivity of the single-walled carbon nanotube unit having high crystallinity, resistance of the negative electrode may be reduced and the input/output characteristics and life characteristics of the battery may be significantly improved. Furthermore, since the carbon nanotube structures may be interconnected to have a network structure in the second negative electrode active material layer directly under pressure during rolling, damage (e.g., breakage phenomenon such as cracks) of the second negative electrode active material may be suppressed. Also, even if cracks are generated in the second negative electrode active material, since the carbon nanotube structure may connect the second negative electrode active material while crossing the cracks, the conductive network may be maintained. Furthermore, since the carbon nanotube structure is not easily broken and may maintain its long shape, the conductive network may be strengthened over the entire second negative electrode active material layer. Also, the negative electrode adhesion may be significantly improved by inhibiting the exfoliation of the second negative electrode active material.

Also, since the carbon nanotube structure is included in the second negative electrode active material layer, adhesion between the first negative electrode active material layer and the second negative electrode active material layer may be significantly improved. Due to the form of a long rope that is formed by the horizontal bonding of the single-walled carbon nanotube units within the carbon nanotube structure, second negative electrode active material particles may be well connected to each other through van der Waals force and the negative electrode may be firmly configured. Furthermore, since the carbon nanotube structure and a surface of the carbon-based active material of the first negative electrode active material layer may be more tightly bonded by n-n bonding (stacking) occurring between the same type of carbon, the adhesion between the first negative electrode active material layer and the second negative electrode active material layer may be further strengthened.

In the carbon nanotube structure, the single-walled carbon nanotube unit may have an average diameter of 0.5 nm to 10 nm, for example, 1 nm to 9 nm. In a case in which the average diameter is satisfied, there is an effect of maximizing the conductivity in the negative electrode even with a very small amount of the conductive agent. The average diameter corresponds to an average value of diameters of top 100 single-walled carbon nanotube units having a large diameter and bottom 100 single-walled carbon nanotube units when the prepared negative electrode is observed by a transmission electron microscope (TEM).

In the carbon nanotube structure, the single-walled carbon nanotube unit may have an average length of 1 μm to 100 μm, for example, 5 μm to 50 μm. In a case in which the average length is satisfied, since a long conductive path for conductive connection between the second negative electrode active material particles may be formed and a unique network structure may be formed, there is an effect of maximizing the conductivity in the negative electrode even with a very small amount of the conductive agent. The average length corresponds to an average value of lengths of top 100 single-walled carbon nanotube units having a large length and bottom 100 single-walled carbon nanotube units when the prepared negative electrode is observed by a TEM.

The single-walled carbon nanotube unit may have a Brunauer-Emmett-Teller (BET) specific surface area of 500 $m^2/g$ to 1,000 $m^2/g$, for example, 600 $m^2/g$ to 800 $m^2/g$. When the above range is satisfied, since the conductive path in the negative electrode may be smoothly secured due to the large specific surface area, there is an effect of maximizing the conductivity in the negative electrode even with a very small amount of the conductive agent. The specific surface area of the single-walled carbon nanotube unit may be calculated from a nitrogen gas adsorption amount at a liquid nitrogen temperature (77K) using BELSORP-mini II by Bell Japan Inc.

The carbon nanotube structure may have an average diameter of 2 nm to 500 nm, particularly 5 nm to 200 nm, and more particularly 5 nm to 50 nm. When the above range is satisfied, since it is effective in forming the conductive network and is advantageous for the connection between the second negative electrode active material particles, excellent electrical conductivity may be achieved. The average diameter corresponds to an average value of diameters of top 100 carbon nanotube structures having a large diameter and bottom 100 carbon nanotube structures when the prepared negative electrode is observed by a scanning electron microscope (SEM).

The carbon nanotube structure may have an average length of 1 μm to 500 μm, particularly 1 μm to 100 μm, and more particularly 2 μm to 50 μm. When the above range is satisfied, since it is effective in forming the conductive network and is advantageous for the connection between the second negative electrode active material particles, excellent electrical conductivity may be achieved. The average length corresponds to an average value of lengths of top 100 carbon nanotube structures having a large length and bottom 100 carbon nanotube structures when the prepared negative electrode is observed by an SEM.

The carbon nanotube structure may be included in an amount of 0.01 wt % to 1.0 wt %, particularly 0.01 wt % to 0.5 wt %, and more particularly 0.01 wt % to 0.2 wt % in the second negative electrode active material layer. When the above range is satisfied, since a conductive path of the second negative electrode active material layer may be secured, the life characteristics of the battery may be improved while a low level of the negative electrode resistance is maintained. In a case in which the bundle type carbon nanotubes are completely dispersed (as a general dispersion method, dispersion is performed so that single strands of the carbon nanotube units are separated from each other as much as possible) during the preparation of the conductive agent dispersion, the carbon nanotube structure is not formed, or, even if the carbon nanotube structure is formed unintentionally, the carbon nanotube structure is formed in a very small amount (e.g., 0.0005 wt %). That is, the above amount range may never be achieved by a general method. Since, the carbon nanotube structure has a form in which 2 to 5,000 single-walled carbon nanotube units are arranged side by side and bonded together, the carbon nanotube structure may not be cut even with changes in the volume of the second negative electrode active material and their length may be smoothly maintained. Thus, the conductive network of the second negative electrode active material layer may be maintained, and the conductivity of the second negative electrode active material layer may be smoothly secured due to the high conductivity of the carbon nanotube structure. Accordingly, the input/output characteristics and life characteristics of the battery may be excellent even if the amount of the carbon nanotube structure in the second negative electrode active material layer is low.

In some cases, the single-walled carbon nanotube unit may be surface-treated by an oxidation treatment or nitridation treatment to improve affinity with a dispersant.

The second conductive agent may further include at least one selected from the group consisting of fullerene, carbon black, carbon nanotube unit, and graphene. In this case, since the one-dimensional linear conductive network may become a two or higher-dimensional conductive network by complex application of the above materials and the carbon nanotube structure, the conductivity of the second negative electrode active material layer may be improved, and the input/output characteristics and life characteristics of the battery may be improved.

The second negative electrode active material layer may have a thickness of 1 μm to 100 μm, particularly 5 μm to 90 μm, and more particularly 10 μm to 80 μm. In a case in which the thickness of the second negative electrode active material layer satisfies the above range, the above-described migration phenomenon of the binder and the conductive agent may be minimized. Accordingly, the adhesion of the negative electrode (adhesion between the negative electrode active material layer and the current collector), the adhesion between the first negative electrode active material layer and the second negative electrode active material layer, and the electrical conductivity of the negative electrode may be significantly improved, and the input/output characteristics and life characteristics of the battery may be improved.

The thickness of the second negative electrode active material layer may be greater than or equal to the thickness of the first negative electrode active material layer. A ratio of the thickness of the first negative electrode active material layer to the thickness of the second negative electrode active material layer may be in a range of 10:90 to 50:50, particularly 20:80 to 50:50, and more particularly 25:75 to 50:50. In a case in which the ratio does not satisfy the above range, an effect of suppressing the above-described migration phenomenon of the binder and the conductive agent is reduce, and an effect of improving diffusion resistance by improving porosity of the second negative electrode active material layer is reduced. Since the effect of suppressing the above-described migration phenomenon of the binder and the conductive agent is reduced even when the thickness of the first negative electrode active material layer is outside the above range and excessively small, an effect of improving the negative electrode adhesion and improving interfacial resistance becomes insignificant.

An interface exists between the first negative electrode active material layer and the second negative electrode active material layer. This may be confirmed by a cross section of the prepared negative electrode. In contrast, if the negative electrode active material layer is formed in a single-layer structure rather than a multi-layer structure (only one coating is performed by using a single negative electrode slurry), the interface is not observed.

The first negative electrode active material layer and the second negative electrode active material layer each may further include a binder, and the binder of the first negative electrode active material layer and the binder of the second negative electrode active material layer may be the same or may be different from each other. The binder is for securing adhesion between the negative electrode active materials or adhesion of the negative electrode active material to the current collector, wherein common binders used in the art may be used, and types thereof are not particularly limited. The binder, for example, may include a polyvinylidene fluoride-hexafluoropropylene copolymer (PVDF-co-HEP), polyvinyl alcohol, polyacrylonitrile, starch, hydroxypropyl cellulose, regenerated cellulose, polyvinylpyrrolidone, polytetrafluoroethylene, polyethylene, polypropylene, an ethylene-propylene-diene polymer (EPDM), a sulfonated EPDM, carboxymethyl cellulose (CMC), a styrene-butadiene rubber (SBR), a fluoro rubber, or various copolymers thereof, and any one thereof or a mixture of two or more thereof may be used.

The binder may be included in an amount of 10 wt % or less, for example, 0.1 wt % to 5 wt % in the first negative electrode active material layer (or the second negative electrode active material layer). In a case in which the amount of the binder satisfies the above range, excellent negative electrode adhesion may be achieved while minimizing an increase in the negative electrode resistance.

Method of Preparing Negative Electrode

Next, a method of preparing the negative electrode of the present invention will be described.

The method of preparing the negative electrode of the present invention includes the steps of: preparing a first negative electrode slurry and a second negative electrode slurry; forming a first negative electrode active material layer on a negative electrode collector using the first negative electrode slurry; and forming a second negative electrode active material layer on the first negative electrode active material layer using the second negative electrode slurry, wherein the second negative electrode slurry includes a second negative electrode active material and a second conductive agent, wherein the second negative electrode active material includes a silicon-based active material, the silicon-based active material includes $SiO_x$ (0≤x<2), the second conductive agent includes a carbon nanotube structure in which 2 to 5,000 single-walled carbon nanotube units are bonded side by side, and the carbon nanotube structure may be included in an amount of 0.01 wt % to 1.0 wt % in the second negative electrode active material layer. The first negative electrode active material layer, the second negative electrode active material layer, the second negative electrode active material, the second conductive agent, and the carbon nanotube structure are the same as those of the above-described embodiment.

(1) Preparing of the First Negative Electrode Slurry and the Second Negative Electrode Slurry A method of preparing a first negative electrode slurry may be the same as a conventional method of preparing a negative electrode slurry. For example, after preparing a mixture including a first negative electrode active material (same as the first negative electrode active material of the above-described embodiment), a first conductive agent (same as the first conductive agent of the above-described embodiment), and a solvent (binder may be further included), the mixture is stirred to prepare a first negative electrode slurry.

However, in a case in which the first negative electrode slurry includes a carbon nanotube structure, a carbon nanotube structure dispersion to be described later may be prepared.

The solvent, for example, may include water, an amide-based polar organic solvent such as dimethylformamide (DMF), diethyl formamide, dimethyl acetamide (DMAc), and N-methyl pyrrolidone (NMP); alcohols such as methanol, ethanol, 1-propanol, 2-propanol (isopropyl alcohol), 1-butanol (n-butanol), 2-methyl-1-propanol (isobutanol), 2-butanol (sec-butanol), 1-methyl-2-propanol (tert-butanol), pentanol, hexanol, heptanol, or octanol; glycols such as ethylene glycol, diethylene glycol, triethylene glycol, propylene glycol, 1,3-propanediol, 1,3-butanediol, 1,5-pentanediol, or hexylene glycol; polyhydric alcohols such as glycerin, trimethylolpropane, pentaerythritol, or sorbitol; glycol ethers such as ethylene glycol monomethyl ether, diethylene glycol monomethyl ether, triethylene glycol monomethyl ether, tetraethylene glycol monomethyl ether, ethylene glycol monoethyl ether, diethylene glycol monoethyl ether, triethylene glycol monoethyl ether, tetraethylene glycol monoethyl ether, ethylene glycol monobutyl ether, diethylene glycol monobutyl ether, triethylene glycol monobutyl ether, or tetraethylene glycol monobutyl ether;

ketones such as acetone, methyl ethyl ketone, methyl propyl ketone, or cyclopentanone; and esters such as ethyl acetate, γ-butyl lactone, and ε-propiolactone, and any one thereof or a mixture of two or more thereof may be used, but the present invention is not limited thereto. The solvent may be the same as or different from a dispersion medium used in a conductive agent dispersion, and the solvent may preferably be water.

After preparing a mixture including a second negative electrode active material, a carbon nanotube structure dispersion, and a solvent, the second negative electrode slurry may be prepared by stirring the mixture.

The carbon nanotube structure dispersion may be prepared as follows.

The preparation of the carbon nanotube structure dispersion may include the steps of: preparing a mixed solution containing a dispersion medium, a dispersant, and bundle type single-walled carbon nanotubes (bonded body or aggregate of single-walled carbon nanotube units) (S1-1); and dispersing the bundle type single-walled carbon nanotubes by applying a shear force to the mixed solution to form a carbon nanotube structure in which 2 to 5,000 single-walled carbon nanotube units are bonded side by side (S1-2).

In step S1-1, the mixed solution may be prepared by adding bundle type single-walled carbon nanotubes and a dispersant to a dispersion medium. The bundle type single-walled carbon nanotubes are present in the form of a bundle in which the above-described single-walled carbon nanotube units are bonded, wherein the bundle type carbon nanotube includes usually 2 or more, substantially 500 or more, for example, 5,000 or more single-walled carbon nanotube units.

The bundle type single-walled carbon nanotube may have a specific surface area of 500 $m^2/g$ to 1,200 $m^2/g$, for example, 500 $m^2/g$ to 1,000 $m^2/g$. When the above range is satisfied, since the conductive path in the second negative electrode active material layer may be smoothly secured by the wide specific surface area, there is an effect of maximizing the conductivity in the second negative electrode active material layer even with a very small amount of the conductive agent. Also, in order to strengthen the adhesion between the first negative electrode active material layer and the second negative electrode active material layer, the specific surface area is preferably in a range of 500 $m^2/g$ to 800 $m^2/g$.

The bundle type single-walled carbon nanotubes may be included in an amount of 0.1 wt % to 1.0 wt %, for example, 0.2 wt % to 0.5 wt % in the mixed solution. When the above range is satisfied, since the bundle type single-walled carbon nanotubes are dispersed in an appropriate level, a carbon nanotube structure may be formed at an appropriate level and dispersion stability may be improved.

The dispersion medium, for example, may include an amide-based polar organic solvent such as water, dimethylformamide (DMF), diethyl formamide, dimethyl acetamide (DMAc), and N-methyl pyrrolidone (NMP); alcohols such as methanol, ethanol, 1-propanol, 2-propanol (isopropyl alcohol), 1-butanol (n-butanol), 2-methyl-1-propanol (isobutanol), 2-butanol (sec-butanol), 1-methyl-2-propanol (tert-butanol), pentanol, hexanol, heptanol, or octanol; glycols such as ethylene glycol, diethylene glycol, triethylene glycol, propylene glycol, 1,3-propanediol, 1,3-butanediol, 1,5-pentanediol, or hexylene glycol; polyhydric alcohols such as glycerin, trimethylolpropane, pentaerythritol, or sorbitol; glycol ethers such as ethylene glycol monomethyl ether, diethylene glycol monomethyl ether, triethylene glycol monomethyl ether, tetraethylene glycol monomethyl ether, ethylene glycol monoethyl ether, diethylene glycol monoethyl ether, triethylene glycol monoethyl ether, tetraethylene glycol monoethyl ether, ethylene glycol monobutyl ether, diethylene glycol monobutyl ether, triethylene glycol monobutyl ether, or tetraethylene glycol monobutyl ether; ketones such as acetone, methyl ethyl ketone, methyl propyl ketone, or cyclopentanone; and esters such as ethyl acetate, γ-butyrolactone, and ε-propiolactone, and any one thereof or a mixture of two or more thereof may be used, but the present invention is not limited thereto. Specifically, the dispersion medium may be the same as or different from the solvent for preparing the negative electrode slurry, and the dispersion medium may preferably be water.

The dispersant may include at least one selected from a hydrogenated nitrile butadiene rubber, polyvinylidene fluoride, polystyrene, polyvinylpyrrolidone, polyvinyl alcohol, pyrene butyric acid, pyrene sulfonic acid, tannic acid, pyrene methylamine, sodium dodecyl sulfate, and carboxymethyl cellulose, and may specifically be carboxymethyl cellulose, polyvinylidene fluoride, polyvinylpyrrolidone, or a hydrogenated nitrile butadiene rubber.

A weight ratio of the bundle type carbon nanotubes to the dispersant in the carbon nanotube structure dispersion may be in a range of 1:0.1 to 1:10, for example, 1:1 to 1:10. In a case in which the above range is satisfied, since the bundle type single-walled carbon nanotubes are dispersed in an appropriate level, a carbon nanotube structure may be formed at an appropriate level and the dispersion stability may be improved.

A solid content in the mixed solution may be in a range of 0.1 wt % to 20 wt %, for example, 1 wt % to 10 wt %. In a case in which the above range is satisfied, since the bundle type single-walled carbon nanotubes are dispersed in an appropriate level, a carbon nanotube structure may be formed at an appropriate level and the dispersion stability may be improved. Also, the second negative electrode slurry (slurry for preparing the second negative electrode active material layer) may have viscosity and elasticity that are suitable for the formation of the second negative electrode active material layer, and it also contributes to increase the solid content of the second negative electrode slurry.

In step S1-2, a process of dispersing the bundle type carbon nanotubes in the mixed solution may be performed by using a mixing device such as a homogenizer, a bead mill, a ball mill, a basket mill, an attrition mill, a universal stirrer, a clear mixer, a spike mill, a TK mixer, or sonication equipment. Among them, a bead-mill method is preferred in that it may precisely control the diameter of the carbon nanotube structure, may achieve a uniform distribution of the carbon nanotube structure, and may have advantages in terms of cost.

The bead-mill method may be as follows. The mixed solution may be put in a vessel containing beads, and the vessel may be rotated to disperse the bundle type single-walled carbon nanotubes.

In this case, conditions under which the bead-mill method is performed are as follows.

The beads may have an average diameter of 0.5 mm to 1.5 mm, for example, 0.5 mm to 1.0 mm. In a case in which the average diameter satisfies the above range, the diameter of the carbon nanotube structure may be properly controlled without breaking the carbon nanotube structure during a dispersion process, and a dispersion solution with a uniform composition may be prepared.

A rotational speed of the vessel may be in a range of 500 RPM to 10,000 RPM, for example, 2,000 RPM to 6,000 RPM. In a case in which the rotational speed satisfies the above range, the diameter of the carbon nanotube structure may be properly controlled without breaking the carbon nanotube structure during the dispersion process, and a dispersion solution with a uniform composition may be prepared.

The time during which the bead mill is performed may be in a range of 0.5 hours to 2 hours, particularly 0.5 hours to 1.5 hours, and more particularly 0.8 hours to 1 hour. In a case in which the time satisfies the above range, the diameter of the carbon nanotube structure may be properly controlled without breaking the carbon nanotube structure during the dispersion process, and a dispersion solution with a uniform composition may be prepared. The performance time of the bead mill means total time during which the bead mill is used, and, thus, for example, if the bead mill is performed several times, the performance time means total time required for performing the bead mill several times.

The above bead mill conditions are for dispersing the bundle type single-walled carbon nanotubes at an appropriate level, and specifically exclude the case where the bundle type single-walled carbon nanotubes are completely dispersed into single-stranded single-walled carbon nanotubes. That is, the above bead mill conditions are for forming the carbon nanotube structure in which 2 to 5,000 single-walled carbon nanotube units are bonded together side by side in the conductive agent dispersion prepared by appropriately dispersing the bundle type single-walled carbon nanotubes. This may be achieved only when a composition of the mixed solution and dispersion process (e.g., bead mill process) conditions are strictly controlled.

The carbon nanotube structure dispersion may be formed through the above process.

A binder may be further included in the negative electrode slurries (the first negative electrode slurry and the second negative electrode slurry), if necessary. In this case, the binder of the above-described embodiment may be used as the binder.

(2) Forming of the First Negative Electrode Active Material Layer on the Negative Electrode Collector Using the First Negative Electrode Slurry and Forming of the Second Negative Electrode Active Material Layer on the First Negative Electrode Active Material Layer Using the Second Negative Electrode Slurry Next, a first negative electrode active material layer is formed by using the first negative electrode slurry prepared as described above. Specifically, the first negative electrode active material layer may be prepared by a method of coating the first negative electrode slurry on a negative electrode collector and drying the coated negative electrode collector, or may be prepared by a method of casting the first negative electrode slurry on a separate support and then laminating a film separated from the support on the negative electrode collector. If necessary, the first negative electrode active material layer is formed by the above-described method, and a rolling process may then be further performed. In this case, the drying and the rolling may be performed under appropriate conditions in consideration of physical properties of the negative electrode to be finally prepared, and are not particularly limited.

Thereafter, a second negative electrode active material layer is formed by using the second negative electrode slurry prepared as described above. Specifically, the second negative electrode active material layer may be prepared by a method of coating the second negative electrode slurry on the first negative electrode active material layer and drying the second negative electrode slurry, or may be prepared by a method of casting the second negative electrode slurry on a separate support and then laminating a film separated from the support on the first negative electrode active material layer. If necessary, the second negative electrode active material layer is formed by the above-described method, and a rolling process may then be further performed. In this case, the drying and the rolling may be performed under appropriate conditions in consideration of physical properties of the negative electrode to be finally prepared, and are not particularly limited.

Secondary Battery

Next, a secondary battery according to another embodiment of the present invention will be described.

The secondary battery according to another embodiment of the present invention may include the negative electrode of the above-described embodiment.

Specifically, the secondary battery may include the negative electrode, a positive electrode, a separator disposed between the positive electrode and the negative electrode, and an electrolyte, wherein the negative electrode is the same as the negative electrode of the above-described embodiment. Since the negative electrode has been described above, detailed descriptions thereof will be omitted.

The positive electrode may include a positive electrode collector and a positive electrode active material layer which is formed on the positive electrode collector and includes a positive electrode active material.

In the positive electrode, the positive electrode collector is not particularly limited as long as it has conductivity without causing adverse chemical changes in the batteries, and, for example, stainless steel, aluminum, nickel, titanium, fired carbon, or aluminum or stainless steel that is surface-treated with one of carbon, nickel, titanium, or silver may be used. Also, the positive electrode collector may typically have a thickness of 3 µm to 500 µm and may have a surface with fine roughness to improve adhesion to the positive electrode active material. The positive electrode collector may be used in various shapes, for example, a film, a sheet, a foil, a net, a porous body, a foam body, a non-woven fabric body, and the like.

The positive electrode active material may be a typically used positive electrode active material. Specifically, the positive electrode active material may include a layered compound, such as lithium cobalt oxide ($LiCoO_2$) or lithium nickel oxide ($LiNiO_2$), or a compound substituted with one or more transition metals; lithium iron oxides such as $LiFe_3O_4$; lithium manganese oxides such as $Li_{1+c1}Mn_{2-c1}O_4$ ($0 \leq c1 \leq 0.33$), $LiMnO_3$, $LiMn_2O_3$, and $LiMnO_2$; lithium copper oxide ($Li_2CuO_2$); vanadium oxides such as $LiV_3O_8$, $V_2O_5$, and $Cu_2V_2O_7$; nickel (Ni)-site type lithium nickel oxide expressed by a chemical formula of $LiNi_{1-c2}M_{c2}O_2$ (where M is at least one selected from the group consisting of cobalt (Co), manganese (Mn), aluminum (Al), copper (Cu), iron (Fe), magnesium (Mg), boron (B), and gallium (Ga), and c2 satisfies $0.01 \leq c2 \leq 0.3$); lithium manganese composite oxide expressed by a chemical formula of $LiMn_{2-c3}M_{c3}O_2$ (where M is at least one selected from the group consisting of Co, Ni, Fe, chromium (Cr), zinc (Zn), and tantalum (Ta), and c3 satisfies $0.01 \leq c3 \leq 0.1$) or $Li_2Mn_3MO_8$ (where M is at least one selected from the group consisting of Fe, Co, Ni, Cu, and Zn); and $LiMn_2O_4$ having a part of Li being substituted with alkaline earth metal ions, but the positive electrode active material is not limited thereto. The positive electrode may be Li-metal.

The positive electrode active material layer may include a positive electrode conductive agent and a positive electrode binder as well as the above-described positive electrode active material.

In this case, the positive electrode conductive agent is used for providing conductivity to the electrode, wherein any conductive agent may be used without particular limitation as long as it has electronic conductivity without causing adverse chemical changes in the battery. Specific examples of the positive electrode conductive agent may be graphite such as natural graphite and artificial graphite; a carbon-based material such as carbon black, acetylene black, Ketjen black, channel black, furnace black, lamp black, thermal black, and carbon fibers; metal powder, such as copper powder, nickel powder, aluminum powder, and silver powder, or metal fibers; conductive whiskers such as zinc oxide whiskers and potassium titanate whiskers; conductive metal oxide such as titanium oxide; or conductive polymers such as polyphenylene derivatives, and one alone or a mixture of two or more thereof may be used.

Also, the positive electrode binder functions to improve binding between positive electrode active material particles and adhesion between the positive electrode active material and the positive electrode collector. Specific examples of the positive electrode binder may be polyvinylidene fluoride (PVDF), a polyvinylidene fluoride-hexafluoropropylene copolymer (PVDF-co-HEP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene polymer (EPDM), a sulfonated EPDM, a styrene-butadiene rubber (SBR), a fluoro rubber, or various copolymers thereof, and one alone or a mixture of two or more thereof may be used.

The separator separates the negative electrode and the positive electrode and provides a movement path of lithium ions, wherein any separator may be used as the separator without particular limitation as long as it is typically used in a secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer component may be used to secure heat resistance or mechanical strength, and the separator having a single layer or multilayer structure may be selectively used.

The electrolyte may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include a non-aqueous organic solvent and a metal salt.

Examples of the non-aqueous organic solvent may be aprotic organic solvents, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydrofuran, 2-methyl tetrahydrofuran, dimethyl sulfoxide, 1,3-dioxolane, formamide, diemthylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

In particular, ethylene carbonate and propylene carbonate, ring-type carbonates among the carbonate-based organic solvents, well dissociate a lithium salt in the electrolyte solution due to high dielectric constants as high-viscosity organic solvents, and thus, the ring-type carbonate may be preferably used. Since an electrolyte solution having high electrical conductivity may be prepared when the ring-type carbonate is mixed with low-viscosity, low-dielectric constant linear carbonate, such as dimethyl carbonate and diethyl carbonate, in an appropriate ratio, the ring-type carbonate may be more preferably used.

A lithium salt may be used as the metal salt, and the lithium salt is a material that is readily soluble in the non-aqueous electrolyte solution, wherein, for example, any one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

At least one additive, for example, a haloalkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further included in the electrolyte in addition to the above-described electrolyte components for the purpose of improving life characteristics of the battery, preventing a decrease in battery capacity, and improving discharge capacity of the battery.

According to another embodiment of the present invention, a battery module including the secondary battery as a unit cell and a battery pack including the battery module are provided. Since the battery module and the battery pack include the secondary battery having high capacity, high rate capability, and high cycle characteristics, the battery module and the battery pack may be used as a power source of a medium and large sized device selected from the group consisting of an electric vehicle, a hybrid electric vehicle, a plug-in hybrid electric vehicle, and a power storage system.

Hereinafter, the present invention will be described in more detail, according to specific examples.

Preparation Example 1: Preparation of Carbon Black Dispersion 0.4 part by weight of carbon black having an average particle diameter of 35 nm (Imerys Graphite & Carbon, Super C65) and 0.6 part by weight of carboxymethyl cellulose (weight-average molecular weight: 100,000 g/mol, degree of substitution: 1.0) were mixed in 99.0 parts by weight of water, as a dispersion medium, to prepare a mixed solution so that a solid content was 1.0 wt %. The carbon black was dispersed in the solvent by stirring the mixed solution by a bead-mill method and thus, a carbon black dispersion was prepared. In this case, beads had a diameter of 1 mm, a rotational speed of a stirring vessel containing the beads was 3,000 RPM, and the stirring was performed for 60 minutes.

In the carbon black dispersion, an amount of the carbon black was 0.4 wt %, and an amount of the carboxymethyl cellulose was 0.6 wt %.

Preparation Example 2: Preparation of Carbon Nanotube Structure Dispersion 0.4 part by weight of bundle type carbon nanotubes (specific surface area was 650 m$^2$/g) composed of single-walled carbon nanotube units having an average diameter of 1.5 nm and an average length of 5 μm or more and 0.6 part by weight of carboxymethyl cellulose (weight-average molecular weight: 100,000 g/mol, degree of substitution: 1.0) were mixed in 99.0 parts by weight of water, as a dispersion medium, to prepare a mixture so that a solid content was 1.0 wt %.

The bundle type single-walled carbon nanotubes were dispersed in the solvent by stirring the mixture by a bead-mill method and thus, a carbon nanotube structure dispersion was prepared. In this case, beads had a diameter of 1 mm, a rotational speed of a stirring vessel containing the beads was 3,000 RPM, and the stirring was performed for 60 minutes. The carbon nanotube structure dispersion included a carbon nanotube structure in the form in which 2 to 5,000 single-walled carbon nanotube units were bonded side by side.

In the carbon nanotube structure dispersion, an amount of the carbon nanotube structure was 0.4 wt %, and an amount of the carboxymethyl cellulose was 0.6 wt %.

Preparation Example 3: Preparation of Carbon Nanotube Structure Dispersion

A carbon nanotube structure dispersion was prepared in the same manner as in Preparation Example 2 except that the weight-average molecular weight of carboxymethyl cellulose in Preparation Example 2 was changed to 400,000 g/mol (degree of substitution: 1.0). In the dispersion, an amount of the carbon nanotube structure was 0.4 wt %, and an amount of the carboxymethyl cellulose was 0.6 wt %.

Preparation Example 4: Preparation of Single-Walled Carbon Nanotube Unit Dispersion 0.2 part by weight of bundle type carbon nanotubes (specific surface area was 650 m$^2$/g) composed of single-walled carbon nanotube units having an average diameter of 1.5 nm and an average length of 5 μm or more and 1.2 parts by weight of carboxymethyl cellulose (weight-average molecular weight: 100,000 g/mol, degree of substitution: 1.0) were mixed in 98.6 parts by weight of water, as a dispersion medium, to prepare a mixture so that a solid content was 1.4 wt %.

The bundle type single-walled carbon nanotubes were dispersed in the solvent by stirring the mixture by a bead-mill method and thus, a single-walled carbon nanotube unit dispersion was prepared. In this case, beads had a diameter of 1 mm, a rotational speed of a stirring vessel containing the beads was 3,000 RPM, and stirring for 60 minutes under the above conditions was set as one cycle and total 4 cycles (natural cooling was performed for 60 minutes between each cycle) were performed. Accordingly, a single-walled carbon nanotube unit dispersion was prepared. In the dispersion, since the bundle type single-walled carbon nanotubes were completely dispersed, the single-walled carbon nanotube unit only existed as a single-strand unit, but the above-described carbon nanotube structure was not detected. Also, in the single-walled carbon nanotube unit dispersion, an amount of the single-walled carbon nanotube unit was 0.2 wt %, and an amount of the carboxymethyl cellulose was 1.2 wt %.

Preparation Example 5: Preparation of Multi-Walled Carbon Nanotube Unit Dispersion 4.0 parts by weight of bundle type carbon nanotubes (specific surface area was 185 m$^2$/g) composed of multi-walled carbon nanotube units having an average diameter of 10 nm and an average length of 1 μm and 0.6 part by weight of carboxymethyl cellulose (weight-average molecular weight: 100,000 g/mol, degree of substitution: 1.0) were mixed in 95.4 parts by weight of water, as a dispersion medium, to prepare a mixed solution so that a solid content was 4.6 wt %.

The mixed solution was added to a spike mill, in which 80% was filled with beads having a size of 0.65 mm, dispersed, and discharged at a discharge rate of 2 kg/min. The bundle type multi-walled carbon nanotubes were completely dispersed by performing this process twice to prepare a multi-walled carbon nanotube unit dispersion. In the dispersion, an amount of the multi-walled carbon nanotube unit (average diameter: 10 nm) was 4.0 wt %, and an amount of the carboxymethyl cellulose was 0.6 wt %.

EXAMPLES AND COMPARATIVE EXAMPLES

Example 1: Preparation of Negative Electrode (1) Formation of First Negative Electrode Active Material Layer The carbon black dispersion of Preparation Example 1, artificial graphite having an average particle diameter ($D_{50}$) of 21 μm, and a styrene butadiene rubber (SBR) and carboxymethyl cellulose (CMC) (weight-average molecular weight: 100,000 g/mol, degree of substitution: 1.0), as a binder, were mixed with water to prepare a first negative electrode slurry. The negative electrode slurry was coated on a 20 μm thick negative electrode collector (copper (Cu) thin film), dried at 130° C., and then rolled to form a first negative electrode active material layer (thickness: 50 μm).

94.80 wt % of the artificial graphite, 3.5 wt % of the SBR, 1.2 wt % of the CMC, and 0.50 wt % of the carbon black were included in the first negative electrode active material layer.

(2) Formation of Second Negative Electrode Active Material Layer

The carbon nanotube structure dispersion of Preparation Example 2, a negative electrode active material (weight ratio of artificial graphite having an average particle diameter ($D_{50}$) of 21 μm: SiO having an average particle diameter ($D_{50}$) of 6.6 μm=94:6), and an SBR and carboxymethyl cellulose (CMC) (weight-average molecular weight: 100, 000 g/mol, degree of substitution: 1.0), as a binder, were mixed with water to prepare a second negative electrode slurry. The second negative electrode slurry was coated on the first negative electrode active material layer, dried at 130° C., and then rolled to form a second negative electrode active material layer (thickness: 50 μm).

A total of 96.25 wt % of the negative electrode active material, 2.5 wt % of the SBR, 1.2 wt % of the CMC, and 0.05 wt % of the carbon nanotube structure were included in the second negative electrode active material layer.

Example 2: Preparation of Negative Electrode

A negative electrode was prepared in the same manner as in Example 1 except that the carbon nanotube structure dispersion of Preparation Example 3 was used instead of the carbon nanotube structure dispersion of Preparation Example 2 when the second negative electrode active material layer was formed in Example 1.

Example 3: Preparation of Negative Electrode

A negative electrode was prepared in the same manner as in Example 1 except that the multi-walled carbon nanotube unit dispersion of Preparation Example 5 was used instead of the carbon black dispersion of Preparation Example 1 during the formation of the first negative electrode slurry in Example 1.

Example 4: Preparation of Negative Electrode

A negative electrode was prepared in the same manner as in Example 1 except that the carbon nanotube structure dispersion of Preparation Example 2 and the multi-walled carbon nanotube unit dispersion of Preparation Example 5 were used instead of the carbon black dispersion of Preparation Example 1 during the formation of the first negative electrode slurry in Example 1. A weight ratio of the carbon nanotube structure to the multi-walled carbon nanotubes in the prepared first negative electrode active material layer was 10:90. 94.80 wt % of the artificial graphite, 3.5 wt % of the SBR, 1.2 wt % of the CMC, 0.05 wt % of the carbon nanotube structure, and 0.45 wt % of the multi-walled carbon nanotube unit were included in the first negative electrode active material layer.

Example 5: Preparation of Negative Electrode

A negative electrode was prepared in the same manner as in Example 1 except that the carbon nanotube structure dispersion of Preparation Example 2 was used instead of the carbon black dispersion of Preparation Example 1 during the formation of the first negative electrode slurry in Example 1. 95.25 wt % of the artificial graphite, 3.5 wt % of the SBR, 1.2 wt % of the CMC, and 0.05 wt % of the carbon nanotube structure were included in the first negative electrode active material layer.

Comparative Example 1: Preparation of Negative Electrode

The carbon nanotube structure dispersion of Preparation Example 2, a negative electrode active material (weight ratio of artificial graphite having an average particle diameter ($D_{50}$) of 21 μm: SiO having an average particle diameter ($D_{50}$) of 6.6 μm=94:6), and an SBR and carboxymethyl cellulose (CMC) (weight-average molecular weight: 100,000 g/mol, degree of substitution: 1.0), as a binder, were mixed with water to prepare a negative electrode slurry. The negative electrode slurry was coated on a 20 μm thick negative electrode collector (copper (Cu) thin film), dried at 130° C., and then rolled to form a negative electrode active material layer (thickness: 100 μm).

A total of 95.75 wt % of the negative electrode active material, 3.0 wt % of the SBR, 1.2 wt % of the CMC, and 0.05 wt % of the carbon nanotube structure were included in the negative electrode active material layer.

Comparative Example 2: Preparation of Negative Electrode

A negative electrode was prepared in the same manner as in Example 1 except that the single-walled carbon nanotube unit dispersion of Preparation Example 4 was used instead of the carbon nanotube structure dispersion of Preparation Example 2 during the formation of the second negative electrode active material layer of Example 1.

A total of 96.25 wt % of the negative electrode active material (weight ratio of artificial graphite having an average particle diameter ($D_{50}$) of 21 μm: SiO having an average particle diameter ($D_{50}$) of 6.6 μm=94:6), 2.5 wt % of the SBR, 1.2 wt % of the CMC, and 0.05 wt % of the single-walled carbon nanotube units were included in the second negative electrode active material layer.

Comparative Example 3: Preparation of Negative Electrode

A negative electrode was prepared in the same manner as in Example 1 except that the multi-walled carbon nanotube unit dispersion of Preparation Example 5 was used instead of the carbon nanotube structure dispersion of Preparation Example 2 during the formation of the second negative electrode active material layer of Example 1.

A total of 95.80 wt % of the negative electrode active material (weight ratio of artificial graphite having an average particle diameter ($D_{50}$) of 21 μm: SiO having an average particle diameter ($D_{50}$) of 6.6 μm=94:6), 2.5 wt % of the SBR, 1.2 wt % of the CMC, and 0.5 wt % of the multi-walled carbon nanotube units were included in the second negative electrode active material layer.

TABLE 1

| | First negative electrode active material layer | | | | Second negative electrode active material layer | |
|---|---|---|---|---|---|---|
| | Carbon black content (wt %) | Multi-walled carbon nanotube unit content (wt %) | Carbon nanotube structure content (wt %) | Carbon nanotube structure content (wt %) | Single-walled carbon nanotube unit (completely dispersed form) content (wt %) | Multi-walled carbon nanotube unit content (wt %) |
| Example 1 | 0.5 | — | — | 0.05 | — | — |
| Example 2 | 0.5 | — | — | 0.05 | — | — |
| Example 3 | — | 0.5 | — | 0.05 | — | — |
| Example 4 | — | 0.45 | 0.05 | 0.05 | — | — |
| Example 5 | — | — | 0.05 | 0.05 | — | — |
| Comparative Example 1 | The negative electrode active material layer was prepared as a single layer, and the amount of the carbon nanotube structure was 0.05 wt % in the entire negative electrode active material layer | | | | | |
| Comparative Example 2 | 0.5 | — | — | — | 0.05 | — |
| Comparative Example 3 | 0.5 | — | — | — | — | 0.5 |

In Examples 1 and 3 to 5 and Comparative Example 1, an average diameter of the carbon nanotube structure was 10 nm, and an average length thereof was 8.2 μm. In Example 2, an average diameter of the carbon nanotube structure was 100 nm, and an average length thereof was 15.6 μm. In Comparative Example 2, an average diameter of the single-walled carbon nanotube unit was 1.6 nm, and an average length thereof was 1.8 μm.

In the negative electrodes of Examples 3 and 4 and Comparative Example 3, an average diameter of the multi-walled carbon nanotube unit was 10.8 nm, and an average length thereof was 1.3 μm.

The average diameter and average length correspond to an average value of diameters (or lengths) of top 100 carbon nanotube structures (or multi-walled carbon nanotube units, or single-walled carbon nanotube units) with a larger diameter (or length) and bottom 100 carbon nanotube structures (or multi-walled carbon nanotube units, or single-walled carbon nanotube units) when the prepared negative electrode is observed by a transmission electron microscope (TEM).

Experimental Example 1: Observation of Negative Electrode (1) Binder Distribution FIG. 1 includes images of analysis of binder distributions in the negative electrode of Comparative Example 1 and the negative electrode of Example 1. The analysis was performed by an osmium oxide ($OsO_4$) staining method. Specifically, the negative electrode was stained by being exposed/left standing for 3 days in a fume atmosphere of osmium oxide in a sealed special chamber prepared in a glove box, and the atmosphere was replaced with an argon (Ar) atmosphere. After one day, a cross section of the negative electrode, which was cut by ion milling, was analyzed by image mapping using scanning electron microscope-energy dispersive X-ray spectroscopy (SEM-EDX).

Figure 1:
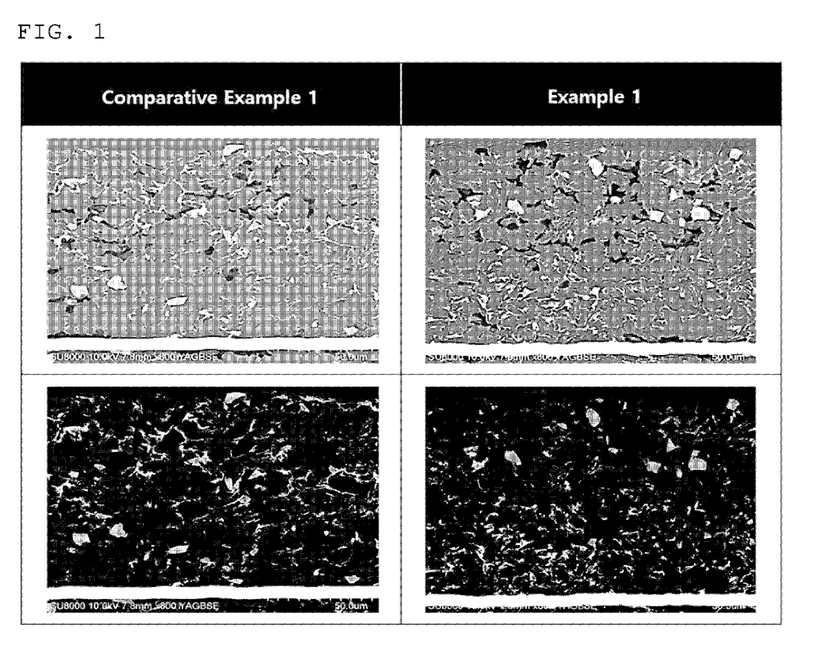
FIG. 1 is images of analysis of binder distributions in a negative electrode of Comparative Example 1 and a negative electrode of Example 1.

FIG. 1 includes images of analysis of Comparative Example 1 (left), in which the negative electrode active material layer was formed as a single layer, and Example 1 (right) in which two layers of the first and second negative electrode active material layers were formed. Referring to the right image, it may be understood that, in Example 1, the first and second negative electrode active material layers had different compositions from each other, and it may be understood that binder distribution ratios for the first and second negative electrode active material layers were also different from each other. Particularly, in a case in which the first and second negative electrode active material layers were respectively formed as in Example 1, it may be understood that SiO was located only in the second negative electrode active material layer, and it may be understood that the amount of the binder in the first negative electrode active material layer was larger. Also, it may be understood that the binder distribution was varied in a thickness direction of the negative electrode active material layer.

(2) Confirmation of the Presence of Carbon Nanotube Structure

Figure 2:
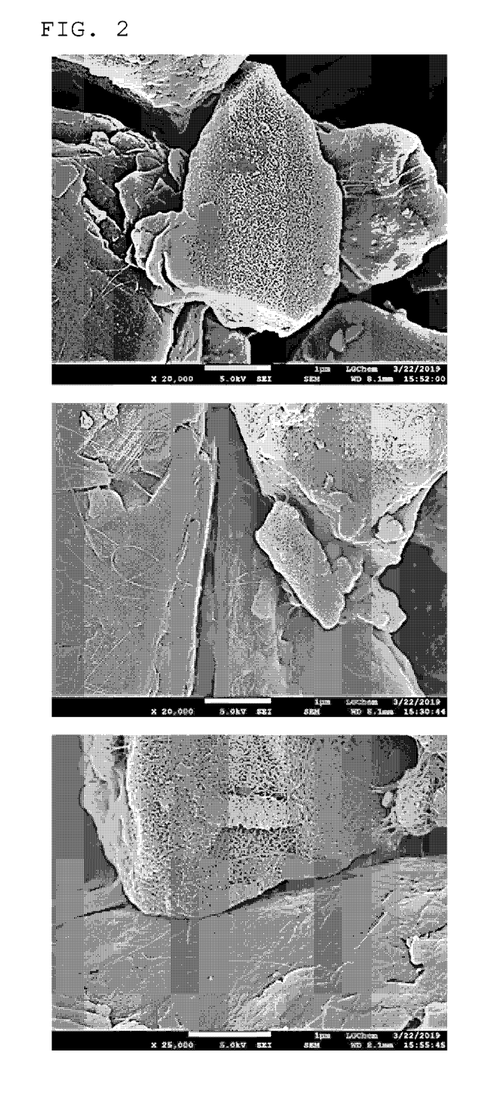
FIG. 2 is scanning electron microscope (SEM) images of a second negative electrode active material layer of the negative electrode of Example 1.
Figure 3:
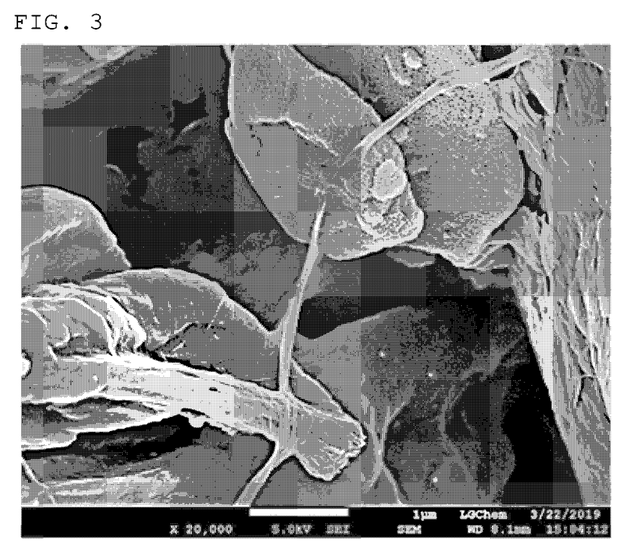
FIG. 3 is an SEM image of a second negative electrode active material layer of a negative electrode of Example 2.
Figure 4:
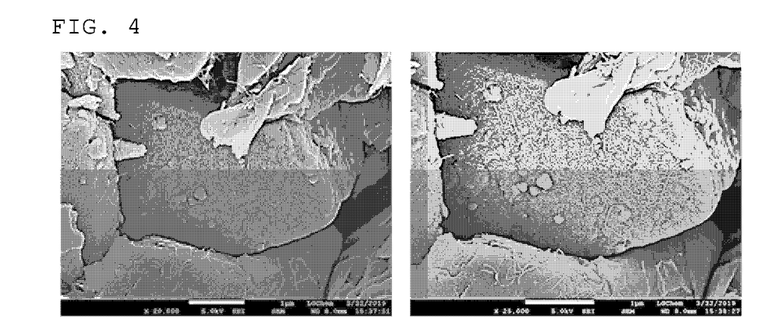
FIG. 4 includes SEM images of a second negative electrode active material layer of a negative electrode of Comparative Example 3.
Figure 6:
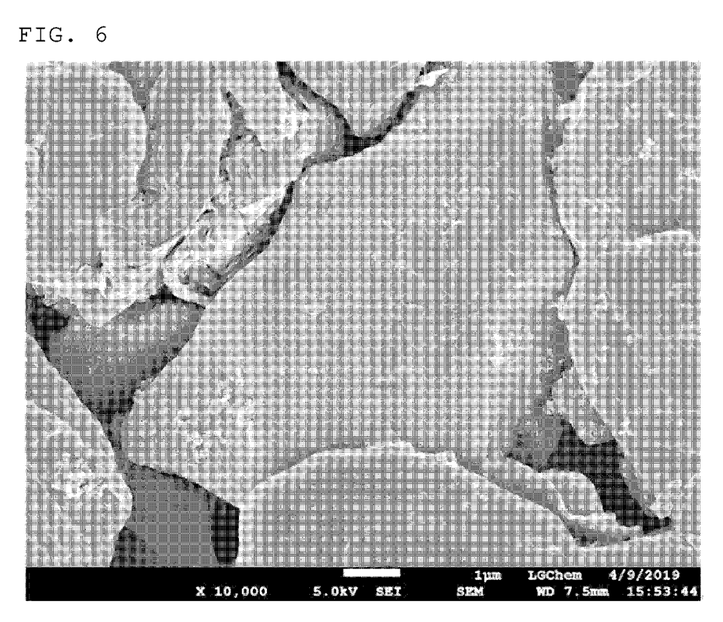
FIG. 6 is an SEM image of a second negative electrode active material layer of a negative electrode of Comparative Example 2.

FIG. 2 includes SEM images of the second negative electrode active material layer of the negative electrode of Example 1, and FIG. 3 is an SEM image of the second negative electrode active material layer of the negative electrode of Example 2. FIG. 4 is SEM images of the second negative electrode active material layer of the negative electrode of Comparative Example 3. FIG. 6 is an SEM image of the second negative electrode active material layer of the negative electrode of Comparative Example 2.

Referring to FIGS. 2 and 3, it may confirm the presence of carbon nanotube structures in the form of a long rope in which a plurality of single-walled carbon nanotube units are arranged side by side and bonded to each other. Particularly, it may be understood that, in the negative electrode of Example 1 of FIG. 2, the carbon nanotube structure having an average diameter of about 10 nm was formed because the hydrogenated nitrile butadiene rubber having a relatively low weight-average molecular weight was used, and, with respect to FIG. 3, it may be understood that the carbon nanotube structure having an average diameter of about 100 nm was formed. It may be understood that the carbon nanotube structures constituted a network structure with each other in both FIGS. 2 and 3.

In contrast, only short-length multi-walled carbon nanotube units were shown in FIG. 4, but a carbon nanotube structure was not observed. Also, in FIG. 6, only single-walled carbon nanotube units existing in a single-stranded unit were shown, but a carbon nanotube structure was not observed.

(3) Confirmation of Network by the Second Conductive Agent

Figure 5:
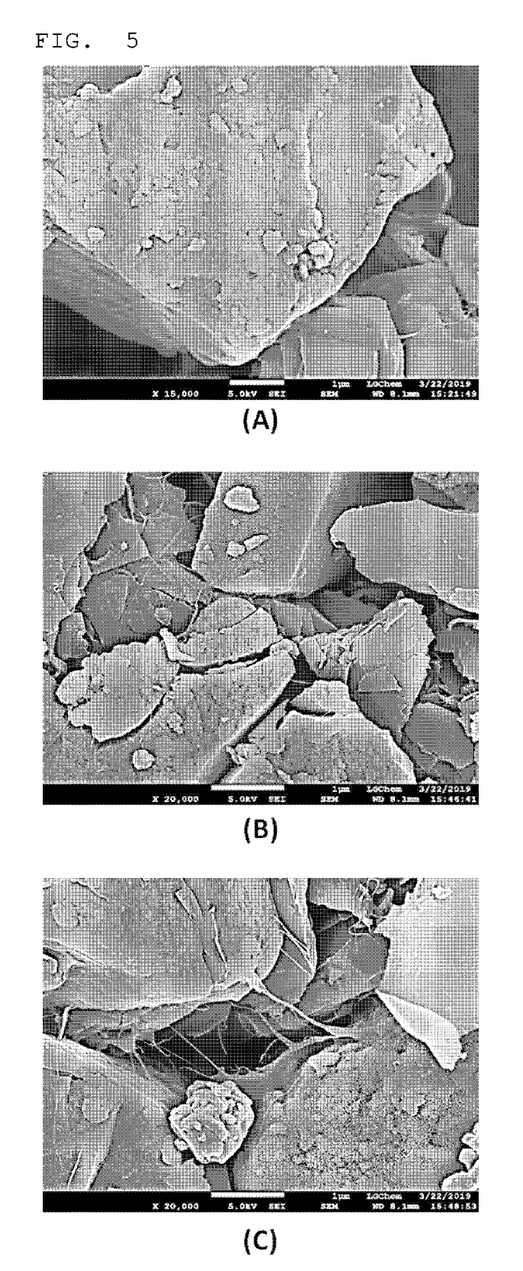
FIG. 5 includes SEM images of the second negative electrode active material layer of the negative electrode of Example 1.

FIGS. 5(A), (B) and (C) include SEM images of the second negative electrode active material layer of the negative electrode of Example 1. Referring to (A) of FIG. 5, it may be understood that cracks in SiO may be suppressed by the carbon nanotube structure. Referring to (B) of FIG. 5, it may be understood that the carbon nanotube structure was maintained on cracked SiO so that a conductive network was not broken. Referring to (C) of FIG. 5, it may be understood that a long conductive network was formed due to a long length of the carbon nanotube structure.

Experimental Example 2: Negative Electrode Adhesion Evaluation

Negative electrode adhesion (adhesion between the negative electrode active material layer and the current collector) was measured under dry conditions. Specifically, after a double-sided tape was attached to a slide glass and each negative electrode punched to a size of 20 mm×180 mm was placed thereon, a 2 kg roller was reciprocated 10 times to attach the electrode to the tape, and the electrode was then pulled at a rate of 200 mm/min using a universal testing machine (UTM, TA instruments) to measure a force detached from the slide glass. In this case, a measurement angle between the slide glass and the negative electrode was 90°. Measurement results are presented in Table 2 below.

Experimental Example 3: Evaluation of Adhesion Between the First Negative Electrode Active Material Layer and the Second Negative Electrode Active Material Layer Shear strengths (N/mm²) were measured for Examples 1 to 4 and Comparative Examples 1 to 3 by the following method. The measurement was made using a surface and interfacial characterization analysis system (SAICAS, SAICAS EN-EX, Daipla Wintes, Japan). Specifically, the shear strength was measured from a force applied to a blade at an interface between the first negative electrode active material layer and the second negative electrode active material layer while performing oblique cutting of each negative electrode from a surface toward the inside thereof using the diamond micro-blade, and the results thereof are presented in Table 2 below.

Experimental Example 4: Evaluation of Capacity Retention and Discharge Capacity According to C-Rate Batteries were respectively prepared as follows by using the negative electrodes of Examples 1 to 5 and Comparative Examples 1 to 3.

Li[Ni$_{0.6}$Mn$_{0.2}$Co$_{0.2}$]O$_2$ was used as a positive electrode active material. The positive electrode active material, carbon black as a conductive agent, and polyvinylidene fluoride (PVdF), as a binder, were mixed in a weight ratio of 94:4:2 in an N-methyl-2-pyrrolidone solvent to prepare a positive electrode slurry.

The positive electrode slurry prepared was coated on a 15 μm thick aluminum metal thin film, as a positive electrode collector, and dried. In this case, a temperature of circulating air was 110° C. Subsequently, the coated and dried positive electrode collector was roll-pressed and dried in a vacuum oven at 130° C. for 2 hours to form a positive electrode active material layer.

Each of the negative electrodes of Examples 1 to 5 and Comparative Examples 1 to 3, the above-prepared positive electrode, and a porous polyethylene separator were assembled by using a stacking method, and an electrolyte solution (ethylene carbonate (EC)/ethyl methyl carbonate (EMC)=1/2 (volume ratio), lithium hexafluorophosphate (LiPF$_6$ 1 mol)) was injected into the assembled battery to prepare a lithium secondary battery.

1) Evaluation of Discharge Capacity According to C-Rate

A charge C-rate was fixed at 0.2 C, and 2.0 C discharge capacity (%) relative to 0.2 C discharge capacity was measured for each lithium secondary battery while increasing a discharge C-rate from 0.2 C to 2.0 C, and the result thereof are presented in Table 2.

2) Capacity Retention (Life Characteristics) Evaluation

Charge and discharge of each of the lithium secondary batteries were performed under the following conditions.

Charge/discharge of each lithium secondary battery at 0.33 C/0.33 C in a voltage range of 4.25 V to 2.8 V at 45° C. were set as one cycle, and total 100 cycles were performed. Thereafter, discharge capacity (capacity retention) after 100 cycles was evaluated based on discharge capacity after one cycle at 100% and presented in Table 2.

TABLE 2

| | Negative electrode adhesion (gf/20 mm) | Adhesion between the first and second negative electrode active material layers (N/mm$^2$) | 2.0 C discharge capacity (%) | Capacity retention (%) |
|---|---|---|---|---|
| Example 1 | 38.9 | 2.2 | 93.4 | 96.6 |
| Example 2 | 38.1 | 2.1 | 92.9 | 95.9 |
| Example 3 | 37.3 | 2.2 | 94.1 | 97.2 |
| Example 4 | 36.2 | 2.4 | 95.3 | 98.5 |
| Example 5 | 40.2 | 2.5 | 93.0 | 96.2 |
| Comparative Example 1 | 35.6 | 1.9 | 92.6 | 95.8 |
| Comparative Example 2 | 36.5 | 0.6 | 88.4 | 92.9 |
| Comparative Example 3 | 36.8 | 0.8 | 91.9 | 94.8 |

Referring to Table 2, in a case in which the second negative electrode active material layer included the carbon nanotube structure, it may be understood that input/output characteristics and life characteristics of the battery may be improved, and negative electrode adhesion and adhesion between the first negative electrode active material layer and the second negative electrode active material layer may be improved.

The invention claimed is:

1. A negative electrode comprising a negative electrode collector, a first negative electrode active material layer disposed on the negative electrode collector, and a second negative electrode active material layer disposed on the first negative electrode active material layer,
    wherein the second negative electrode active material layer comprises a second negative electrode active material and a second conductive agent,
    wherein the second negative electrode active material comprises a silicon-based active material,
    the silicon-based active material comprises SiO$_x$(0≤x<2),
    the second conductive agent comprises a carbon nanotube structure in which 2 to 5,000 single-walled carbon nanotube units are bonded side by side in a single plane, and
    the carbon nanotube structure is included in an amount of 0.01 wt % to 1.0 wt % in the second negative electrode active material layer,
    wherein in the carbon nanotube structure, the single-walled carbon nanotube unit has an average diameter of 0.5 nm to 10 nm, and
    wherein the carbon nanotube structure has an average diameter of 10 nm to 100 nm.

2. The negative electrode of claim 1, wherein the carbon nanotube structures are interconnected in the second negative electrode active material layer to form a network structure.

3. The negative electrode of claim 1, wherein, in the carbon nanotube structure, the single-walled carbon nanotube units are bonded in a state in which major axes of the single-walled carbon nanotube units are arranged parallel to each other.

4. The negative electrode of claim 1, wherein the carbon nanotube structure has an average length of 1 μm to 500 μm.

5. The negative electrode of claim 1, wherein the carbon nanotube structure has an average length of 2 μm to 50 μm.

6. The negative electrode of claim 1, wherein the carbon nanotube structure is a carbon nanotube structure in which 2 to 50 single-walled carbon nanotube units are bonded to each other.

7. The negative electrode of claim 1, wherein the first negative electrode active material layer comprises a first negative electrode active material and a first conductive agent, and
    the first conductive agent comprises at least one selected from the group consisting of the carbon nanotube structure, a multi-walled carbon nanotube unit, graphene, and carbon black.

8. The negative electrode of claim 1, wherein the first negative electrode active material layer has a thickness of 1 μm to 100 μm.

9. The negative electrode of claim 1, wherein the second negative electrode active material layer has a thickness of 1 μm to 100 μm.

10. A secondary battery comprising the negative electrode of claim 1.

* * * * *